May 27, 1930.  W. E. MORGAN  1,760,514
REVERSING GEAR ATTACHMENT FOR DRUM HOISTS
Filed March 5, 1926  2 Sheets-Sheet 1

INVENTOR
William E. Morgan
BY
ATTORNEYS

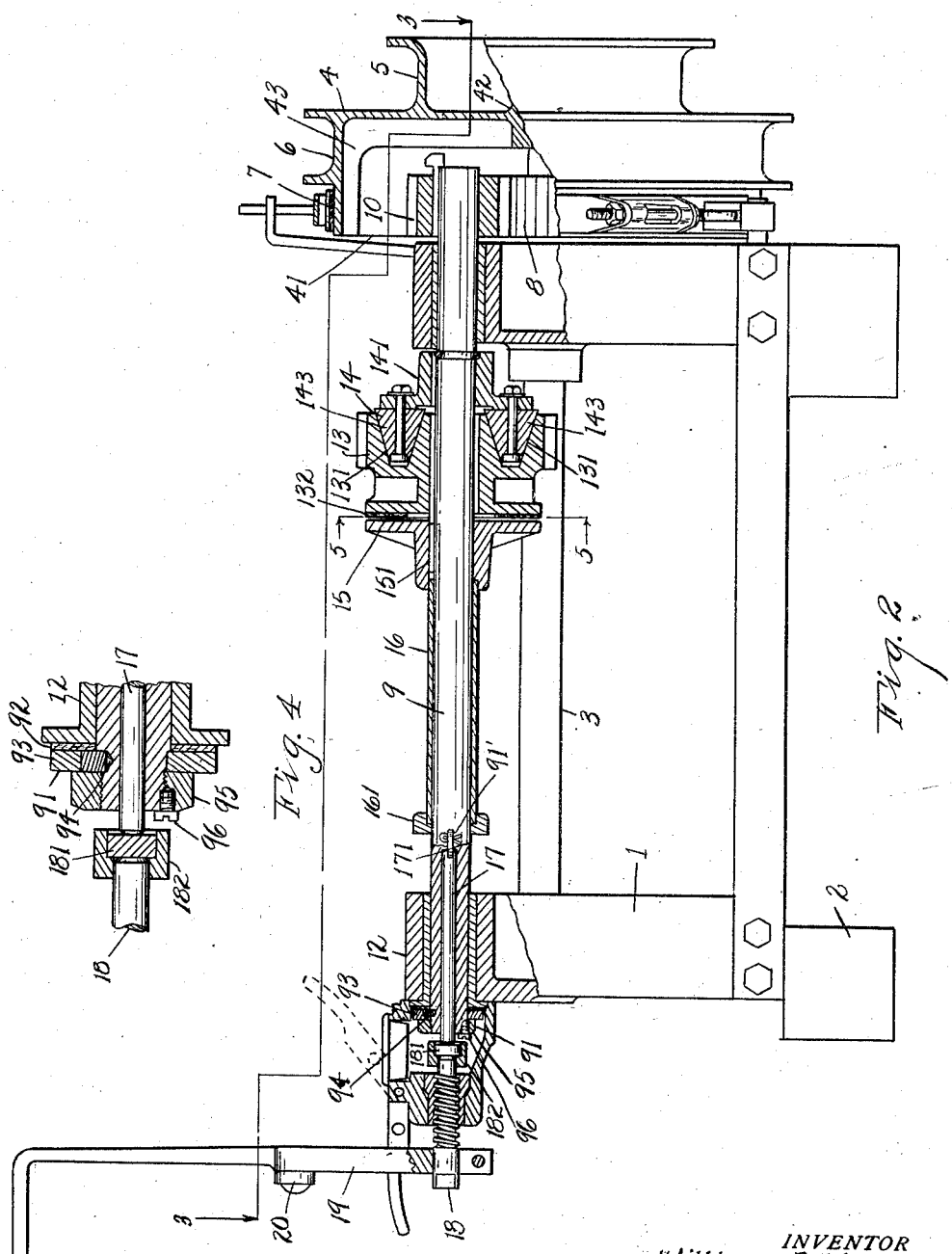

Patented May 27, 1930

1,760,514

UNITED STATES PATENT OFFICE

WILLIAM E. MORGAN, OF EAST LANSING, MICHIGAN, ASSIGNOR TO NOVO ENGINE COMPANY, OF LANSING, MICHIGAN

REVERSING GEAR ATTACHMENT FOR DRUM HOISTS

Application filed March 5, 1926. Serial No. 92,443.

This invention relates to an improved two-speed reversing gear attachment for drum hoist.

The objects of the invention are:

First, to provide improved reversing mechanism.

Second, to provide an improved sheave structure wherein the sheave serves as a housing for the gear.

Objects relating to details and economies of construction and operation will appear from the detailed description to follow. The invention is clearly defined and pointed out in the claim.

A structure which is a preferred embodiment of the invention is illustrated in the accompanying drawings, forming a part of this application, in which:

Fig. 2 is an enlarged detail vertical sectional elevation view, portions being shown in full lines, taken on the plane corresponding to line 2—2 of Figs. 3 and 5.

Figure 1:
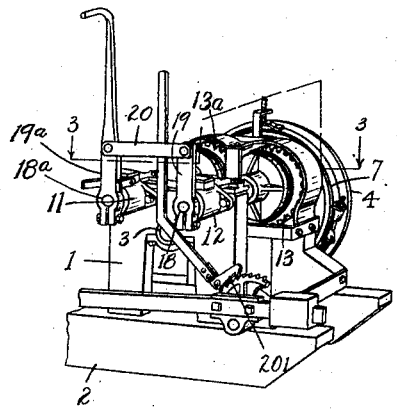
Fig. 1 is a perspective view of the essential parts of my improved reverse mechanism for drum hoist attachment.
Figure 3:
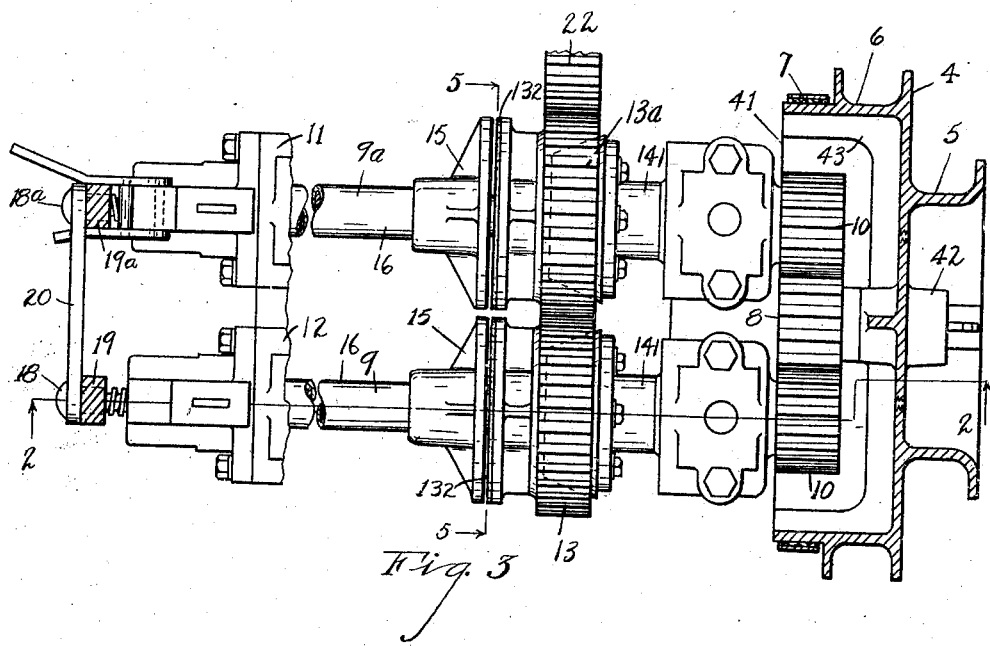

Fig. 3 is a detail plan view, partially in section, taken on the irregular line 3—3 of Figs. 1 and 2, the spur gear being in full lines and a fragment of the drum gear being shown, the shaft 3 being omitted.

Fig. 4 is a detail sectional view of the thrust bearing for the drum shaft, taken on the plane of line 2—2 of Fig. 3.

Figure 5:
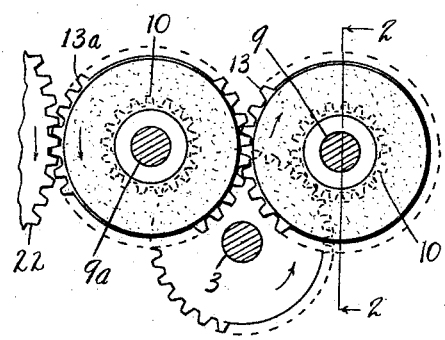

Fig. 5 is a detail sectional view taken on line 5—5 of Figs. 2 and 3, the position of certain gears being indicated by dotted lines.

Parts of the drawing will be referred to by their numerals of reference which identify the same parts in all the views.

1 is the main frame supported on the usual skids 2. 3 is the main driven shaft carrying the two speed sheave 4 which is recessed at 41 to provide a housing for the main gears. 5 is the smaller sheave groove flanged on the face of the pulley and projecting beyond its hub 42 (see Fig. 3). 6 is the larger sheave groove. 7 is the brake rim and brake. Radial ribs 43 strengthen the shell.

The main gear 8 is keyed to the shaft 3. The driving shafts 9 and $9^a$ are each provided with pinions 10 which mesh with and drive the main gear 8. Journal boxes 11, 12 are provided for each shaft 9 and $9^a$. Gears 13 and $13^a$, each provided with clutch members, are journaled on the shafts 9 and $9^a$. Shaft $9^a$ is for direct drive, shaft 9 for reverse.

Each shaft 9 and $9^a$ is shouldered near the end and provided with a thrust bearing 91. This comprises a fiber thrust bearing disk 92, a collar 93 fitting against the shoulder and keyed to the said shaft at 94, the whole being retained in place by the nut 95 secured by the axially disposed set screws 96 (see particularly Fig. 4). A clutch member 14 is fixed on each shaft 9 and $9^a$, being keyed or otherwise secured thereto by the hub 141 retained against longitudinal movement. Friction clutch shoe members 143 of the clutch, which are preferably maple blocks, engage in the annular "conical" recess 131 in the face of each gear 13 and $13^a$.

The movable member 15 of the clutch mechanism is splined at 151 to the shaft so that it can slide longitudinally along the same and engages a clutch disk 132 on the face of the gear 13. This movable member 15 is recessed for the sleeve 16 which is movable lengthwise of the shaft 9 or $9^a$. It is provided with a collar 161, which is engaged by the thrust rod 17 having a cross bar or key 171 disposed in a suitable slot 91' in the said shaft 9 or $9^a$. Right and left hand screws 18 and $18^a$ are carried in suitable nuts axially disposed to act upon the thrust rod 17. Bronze contact disks 181 are held by suitable collars 182 on the ends of the screws 18 and $18^a$, detailed particularly in Fig. 4.

These screws are operated simultaneously by the parallel lever 19, $19^a$, which are secured to the screws 18 and $18^a$ respectively for rocking the same. These are joined together by a link 20 for parallel movement (see Figs. 1 and 3). The screws are so adjusted that when the hand lever stands in the vertical position, as indicated in Fig. 1, both clutches are disengaged.

When the lever is rocked to the right, the left-hand screw with right-hand thread is forced in and the left-hand gear $13^a$ is clutched to the shaft $9^a$ and the drum drives by the direct drive, the left-hand gear 13ª meshing directly with the gear 22 of the hoist drum, shown in fragment in Figs. 3 and 5.

When the lever is forced over to the left, the right-hand screw with left-hand thread is forced in, clamping the right-hand clutch and driving the right-hand gear 13. At the same time the left-hand gear 13ª is released so that it revolves on the shaft 9ª as an idler. This results in reversing the direction of drive of the sheave 42. A suitable latch device 201 is provided for locking the lever at the center or neutral position.

Having thus described my invention what I claim as new and desire to secure by Letters Patent is:

In a reversible gear structure, the combination of a frame, a main shaft with a gear and recessed sheave thereon, said sheave embracing said gear and containing a series of peripheral grooves, parallel drive shafts with gears keyed thereto and meshing with the main gear and housed within the said recess of said sheave, a hoist gear, intermeshing gears with clutch faces revolubly mounted on said drive shafts, one of which is in mesh with said hoist gear, clutches therefor each comprising a member fixed to each of said shafts and an adjustable member slidable thereon to embrace and engage said clutch faces on said gears, and right and left hand screw thrust members for actuating the said clutch members coupled to be operated simultaneously by parallel levers adjusted in a central position to release both clutches and on movement of said lever to one side or the other to lock said clutches alternatively, whereby on clutching one or the other of said gears the direction of drive of the sheave is reversed.

In witness whereof I have hereunto set my hand.

WILLIAM E. MORGAN.